United States Patent

Toba

(10) Patent No.: US 8,966,566 B2
(45) Date of Patent: Feb. 24, 2015

(54) COMMUNICATION DEVICE, COMMUNICATION CONTROL METHOD, AND PROGRAM

(75) Inventor: Kazuaki Toba, Kanagawa (JP)

(73) Assignee: Sony Corporation (JP)

( * ) Notice: Subject to any disclaimer, the term of this patent is extended or adjusted under 35 U.S.C. 154(b) by 611 days.

(21) Appl. No.: 12/932,038

(22) Filed: Feb. 16, 2011

(65) Prior Publication Data

US 2011/0209190 A1 Aug. 25, 2011

(30) Foreign Application Priority Data

Feb. 24, 2010 (JP) ................................ P2010-038227

(51) Int. Cl.

| | |
|---|---|
| *G06F 3/00* | (2006.01) |
| *G06F 13/00* | (2006.01) |
| *H04N 5/445* | (2011.01) |
| *H04N 7/173* | (2011.01) |
| *H04N 7/16* | (2011.01) |
| *H04N 5/775* | (2006.01) |
| *H04L 12/28* | (2006.01) |
| *H04N 21/41* | (2011.01) |
| *H04N 21/426* | (2011.01) |
| *H04N 21/436* | (2011.01) |
| *H04N 21/4363* | (2011.01) |
| *G06F 3/14* | (2006.01) |
| *H04N 5/85* | (2006.01) |

(52) U.S. Cl.

CPC .............. *H04N 5/775* (2013.01); *H04L 12/282* (2013.01); *H04L 12/2838* (2013.01); *H04N 21/4122* (2013.01); *H04N 21/42646* (2013.01); *H04N 21/43615* (2013.01); *H04N 21/43632* (2013.01); *G06F 3/1423* (2013.01); *H04L 2012/2849* (2013.01); *H04N 5/85* (2013.01); *G09G 2370/047* (2013.01); *G09G 2370/06* (2013.01); *G09G 2370/12* (2013.01); *G09G 2370/20* (2013.01); *G09G 2370/22* (2013.01)

USPC ............. 725/118; 725/38; 725/109; 725/131; 725/148

(58) Field of Classification Search

CPC .......... G09G 2370/12; G09G 2370/06; H04N 21/43635; H04N 21/4122; G06F 3/1423
USPC ............. 725/105–134, 149; 348/43, 180, 181, 348/720

See application file for complete search history.

(56) References Cited

U.S. PATENT DOCUMENTS

2008/0244649 A1* 10/2008 Ito et al. ......................... 725/38
2009/0295679 A1* 12/2009 Lida et al. ...................... 345/1.1

FOREIGN PATENT DOCUMENTS

JP 2008-153974 A 7/2008

*Primary Examiner* — Benjamin R Bruckart
*Assistant Examiner* — Jen-Shi Huang
(74) *Attorney, Agent, or Firm* — Lerner, David, Littenberg, Krumholz & Mentlik, LLP (57) ABSTRACT

A communication device includes multiple output terminals configured to output, through an interface including at least a signaling channel through which a baseband signal is transmitted in one direction and a bidirectional control channel used for control, the baseband signal, one or more input terminals configured to be input with the baseband signal through the interface, and a control unit, the multiple output terminals including a primary output terminal through which the control is preferentially performed with another device connected to the one or more input terminals and one or more further secondary output terminals, and the control unit configured to perform a control of notifying another device connected to the secondary output terminal of a function of another device connected to the one or more input terminals as a function of the communication device via the control channel.

8 Claims, 7 Drawing Sheets

COMMUNICATION DEVICE, COMMUNICATION CONTROL METHOD, AND PROGRAM

CROSS-REFERENCE TO RELATED APPLICATION

The present application claims priority from Japanese Patent Application No. JP 2010-038227 filed in the Japanese Patent Office on Feb. 24, 2010, the entire content of which is incorporated herein by reference.

BACKGROUND OF THE INVENTION

1. Field of the Invention

The present invention relates to a communication device, a communication control method, and a program, and particularly relates to a communication device, a communication control method, and a program that can improve user-friendliness of devices connected to multiple output terminals.

2. Description of the Related Art

In recent years, the HDMI® has become widespread as a communication interface for high-speed transmission of a baseband (uncompressed) image (video) signal and an audio signal associated with an image thereof.

The HDMI® specification is an interface specification for digital consumer electronics (home appliances). The specification is arranged for audio-visual (AV) electronics based on the Digital Visual Interface (DVI), which is a standard specification for connecting a personal computer (PC) and a display device.

There are three types of devices (referred to below as HDMI® devices) which are to be connected via HDMI®, namely, an HDMI® source, an HDMI® sink, and an HDMI® repeater.

The HDMI® source includes an output terminal from which an image or audio signal is output via HDMI®, and the HDMI® sink includes an input terminal to which the image or audio signal is input via HDMI®. The HDMI® repeater includes one or more input terminals and one or more output terminals to act as both the HDMI® source and the HDMI® sink.

The HDMI® includes a transition minimized differential signaling (TMDS) channel, a consumer electronics control (CEC) line, and other channels. The TMDS channel is a signaling channel through which a baseband image or audio signal is transmitted in one direction from the HDMI® source to the HDMI® sink via the appropriate HDMI® repeater. The CEC line is a bidirectional control channel used in controlling the HDMI® source, the appropriate HDMI® repeater, and the HDMI® sink.

That is, the HDMI® uses the TMDS channel for the physical layer and uses the CEC line for connection of an overall control system for devices connected with HDMI®.

Also, the HDMI® uses the High-bandwidth Digital Content Protection (HDCP) to encrypt a signal for fulfilling a copyright protection function.

Further, the HDMI® uses the Extended Display Identification Data (EDID) for device identification.

That is, the HDMI® uses a DDC/EDID method of the Video Electronics Standard Association (VESA) for device identification.

The Display Data Channel (DDC) is used by the HDMI® source to read the EDID (or Enhanced Extended Display Identification Data (E-EDID)) from the HDMI® sink and the HDMI® repeater.

That is, the HDMI® sink and the HDMI® repeater include an EDID read only memory (EDID ROM) storing the EDID which is information regarding one's configuration or capability. The HDMI® source reads the EDID stored in each EDID ROM of the HDMI® sink and the HDMI® repeater via the DDC to recognize the configuration or the capability of the HDMI® sink and the HDMI® repeater based on the EDID. The EDID includes, for example, brand (manufacturer) of the HDMI® sink, model number, and format (e.g., image resolution) of signal supported by the HDMI® sink.

Figure 1:
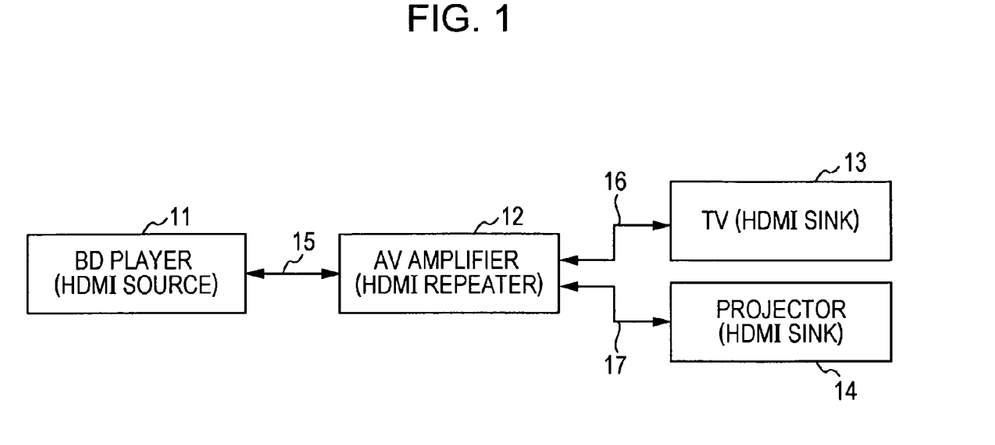
FIG. 1 illustrates an example of a connection of HDMI® devices via the HDMI® repeater including two output terminals.

FIG. 1 shows an example of a connection of HDMI® devices via the HDMI® repeater including two output terminals.

An AV system in FIG. 1 includes a Blu-ray Disc® (BD) player 11, an AV amplifier 12, a TV (television receiver) 13, and a projector 14. Note that a system in this specification refers to a logical collection of multiple devices, regardless of whether devices of respective configurations are in a single case.

The BD player 11 is the HDMI® source, the AV amplifier 12 is the HDMI® repeater, and the BD player 11 and the AV amplifier 12 are connected by an HDMI® cable 15. The TV 13 and the projector 14 are both the HDMI® sink, the AV amplifier 12 and the TV 13 are connected by an HDMI® cable 16, and the AV amplifier 12 and the projector 14 are connected by an HDMI® cable 17.

The BD player 11 outputs an image and audio signal (also referred to below as AV signal) read from a BD as an HDMI® data stream. The AV amplifier 12 outputs the input HDMI® data stream to the TV 13 and the projector 14 simultaneously.

Two HDMI® outputs of the AV amplifier 12 are set as a primary output and a secondary output in advance. In the HDMI® specification, CEC control can be executed with only one HDMI® output. Thus, the CEC control is performed with the primary HDMI® output. In the AV system in FIG. 1, the TV 13 is connected to the primary HDMI® output of the AV amplifier 12, for example.

In this case, addressing for CEC in relation to the BD player 11 is performed only for the TV 13 connected to the primary HDMI® output to enable control with CEC. Meanwhile, addressing is performed for the projector 14 connected to the secondary HDMI® output only in relation to the AV amplifier 12 as the HDMI® repeater. In other words, the projector 14 does not exchange information with the BD player 11 connected to an HDMI® input of the AV amplifier 12.

By connecting the TV 13 and the projector 14 to the two HDMI® outputs of the AV amplifier 12, a user is expected to enjoy two display devices separately depending on contents or situation.

However, while a remote control of the TV 13 connected to the primary HDMI® output is capable of operations such as fast-forwarding of the BD player 11 and volume adjustment of the AV amplifier 12 with the CEC control of HDMI®, such operations are not performed with a remote control of the projector 14 connected to the secondary HDMI® output. Therefore, viewing with the projector 14 is extremely inconvenient.

One example solution to this problem is to enable CEC control of multiple HDMI® sinks by holding a physical address of an HDMI® source virtually (for example, see Japanese Unexamined Patent Application Publication No. 2008-153974).

SUMMARY OF THE INVENTION

However, a method of Japanese Unexamined Patent Application Publication No. 2008-153974 involves a cumbersome reconnection operation due to resetting of HPD or operation of DDC.

It is desirable to improve user-friendliness of devices connected to multiple output terminals.

A communication device according to an embodiment of the present invention includes multiple output terminals configured to output, through an interface including at least a signaling channel through which a baseband signal is transmitted in one direction and a bidirectional control channel used for control, the baseband signal, one or more input terminals configured to be input with the baseband signal through the interface, and a control means, the multiple output terminals including a primary output terminal through which the control is preferentially performed with another device connected to the one or more input terminals and one or more further secondary output terminals, and the control means for performing a control of notifying another device connected to the secondary output terminal of a function of another device connected to the one or more input terminals as a function of the communication device via the control channel.

In a communication control method according to another embodiment of the present invention, a communication device including multiple output terminals configured to output, through an interface including at least a signaling channel through which a baseband signal is transmitted in one direction and a bidirectional control channel used for control, the baseband signal and one or more input terminals configured to be input with the baseband signal through the interface, the multiple output terminals including a primary output terminal through which the control is preferentially performed with another device connected to the one or more input terminals and one or more further secondary output terminals, performs a control of notifying another device connected to the secondary output terminal of a function of another device connected to the one or more input terminals as a function of the communication device via the control channel.

A program according to still another embodiment of the present invention causes a computer of a communication device including multiple output terminals configured to output, through an interface including at least a signaling channel through which a baseband signal is transmitted in one direction and a bidirectional control channel used for control, the baseband signal and one or more input terminals configured to be input with the baseband signal through the interface, the multiple output terminals including a primary output terminal through which the control is preferentially performed with another device connected to the one or more input terminals and one or more further secondary output terminals, to execute a process of notifying another device connected to the secondary output terminal of a function of another device connected to the one or more input terminals as a function of the communication device via the control channel.

According to the embodiments of the present invention, the process of notifying another device connected to the secondary output terminal of a function of another device connected to the one or more input terminals as a function of the communication device via the control channel is executed.

Note that the program can be provided through transmission via a transmission medium or recording on a recording medium.

The communication device may be an individual device or may be an internal block forming one apparatus.

According to the embodiments of the present invention, user-friendliness of devices connected to multiple output terminals can be improved.

DESCRIPTION OF THE PREFERRED EMBODIMENTS

[Configuration Example of an AV System]

Figure 2:
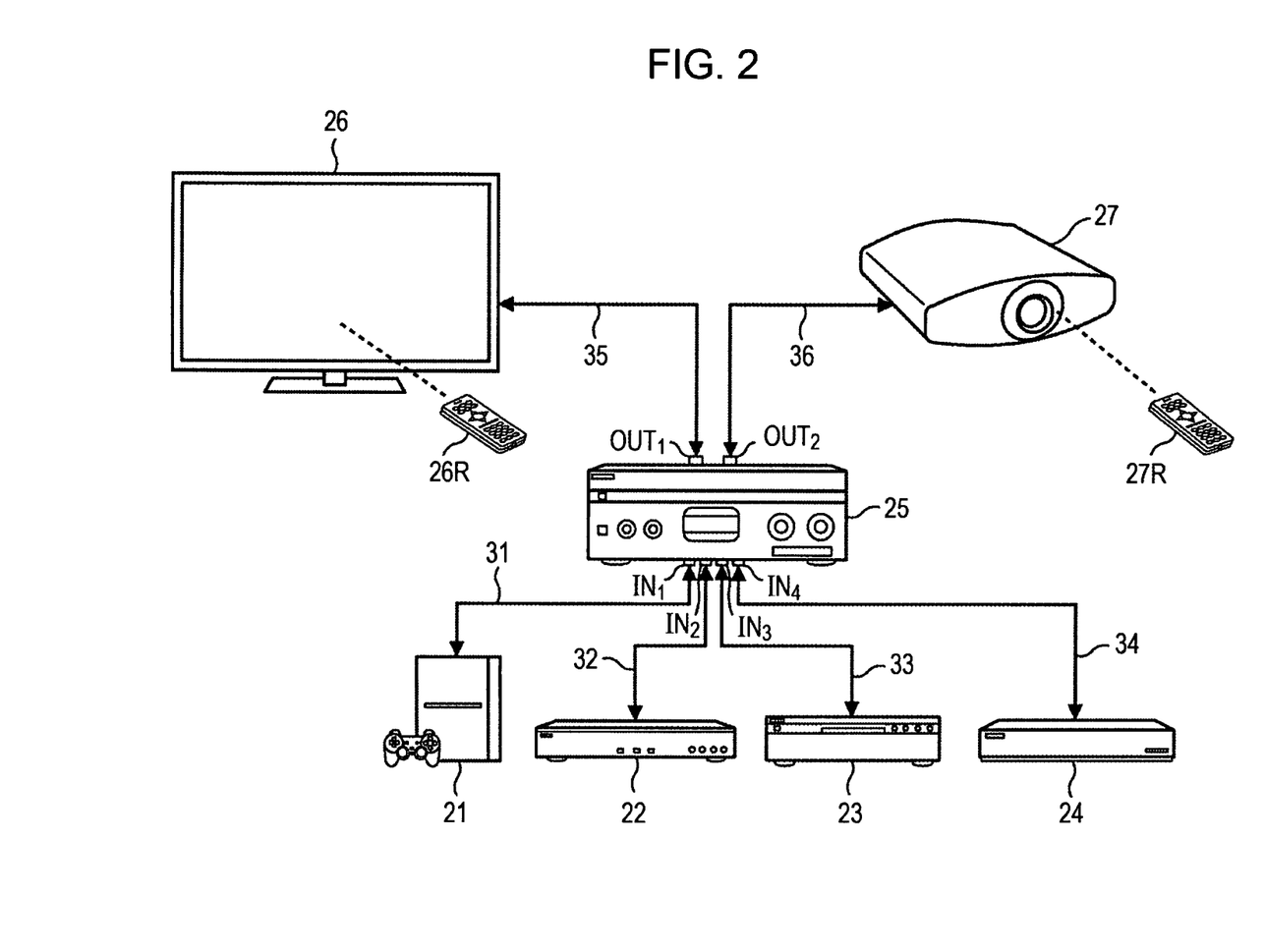
FIG. 2 is a block diagram showing a configuration example of an AV system according to an embodiment of the present invention.

FIG. 2 shows a configuration example of an AV system according to an embodiment of the present invention.

The AV system in FIG. 2 includes a game console 21, a recording/reproducing device 22, a reproducing device 23, a set-top box (STB) 24, an AV amplifier 25, a TV 26, and a projector (multimedia projector) 27.

Each device forming the AV system is an HDMI® device. More specifically, the game console 21, the recording/reproducing device 22, the reproducing device 23, and the STB 24 are HDMI® sources, the AV amplifier 25 is an HDMI® repeater, and the TV 26 and the projector 27 are HDMI® sinks.

Categorized under "playback device" in terms of device type among HDMI® devices, the game console 21 outputs an AV signal read from a predetermined recording medium as an HDMI® data stream. The game console 21 is connected to an HDMI® input terminal IN1 of the AV amplifier 25 with an HDMI® cable 31.

The recording/reproducing device 22 corresponds to what is generally called a personal video recorder (PVR) or a digital video recorder (DVR). The recording/reproducing device 22 includes, for example, a built-in hard disk to record contents on the built-in hard disk, reproduce the contents on the hard disk, and output a reproduced AV signal as an HDMI® data stream. The recording/reproducing device 22 is categorized under "recording device" in terms of device type among HDMI® devices. The recording/reproducing device 22 is connected to an HDMI® input terminal IN2 of the AV amplifier 25 with an HDMI® cable 32.

The reproducing device 23 is, for example, a Blu-ray Disc® (BD) player or a digital versatile disc (DVD) player which outputs an AV signal read from an optical disc recording medium, such as a BD or a DVD, as an HDMI® data stream. The reproducing device 23 is categorized under "playback device" in terms of device type among HDMI® devices. The reproducing device 23 is connected to an HDMI® input terminal IN3 of the AV amplifier 25 with an HDMI® cable 33.

Categorized under "tuner" in terms of device type among HDMI® devices, the STB 24 receives a television signal with a built-in tuner and outputs the television signal as an HDMI® data stream. The STB 24 is connected to an HDMI® input terminal IN4 of the AV amplifier 25 with an HDMI® cable 34.

The AV amplifier 25 includes the four HDMI® input terminals IN1 to IN4 and two HDMI® output terminals OUT1 and OUT2 to output the HDMI® data stream input from the HDMI® input terminals IN1 to IN4 to the TV 26 and the projector 27. Of the two HDMI® output terminals OUT1 and OUT2, the HDMI® output terminal OUT1 is a primary HDMI® output terminal. The HDMI® output terminal OUT1 is connected with the TV 26 with an HDMI® cable 35, and the HDMI® output terminal OUT2 is connected with the projector 27 with an HDMI® cable 36. The AV amplifier 25 is categorized under "audio system" in terms of device type among HDMI® devices.

Categorized under "TV" in terms of device type among HDMI® devices, the TV 26 outputs an image and audio based on the HDMI® data stream input from the AV amplifier 25 via the HDMI® cable 35. The TV 26 comes with a remote control 26R.

Categorized under "TV" in terms of device type among HDMI® devices, the projector 27 outputs an image based on the HDMI® data stream input from the AV amplifier 25 via the HDMI® cable 36. The projector 27 comes with a remote control 27R.

In the AV system configured in a manner described above, a user can cause the TV 26 and the projector 27 to display an image output from the game console 21, the recording/reproducing device 22, the reproducing device 23, or the STB 24 as the HDMI® source via the AV amplifier 25 to view the image.

[Physical Address and Logical Address of an HDMI® Device]

Figure 3:
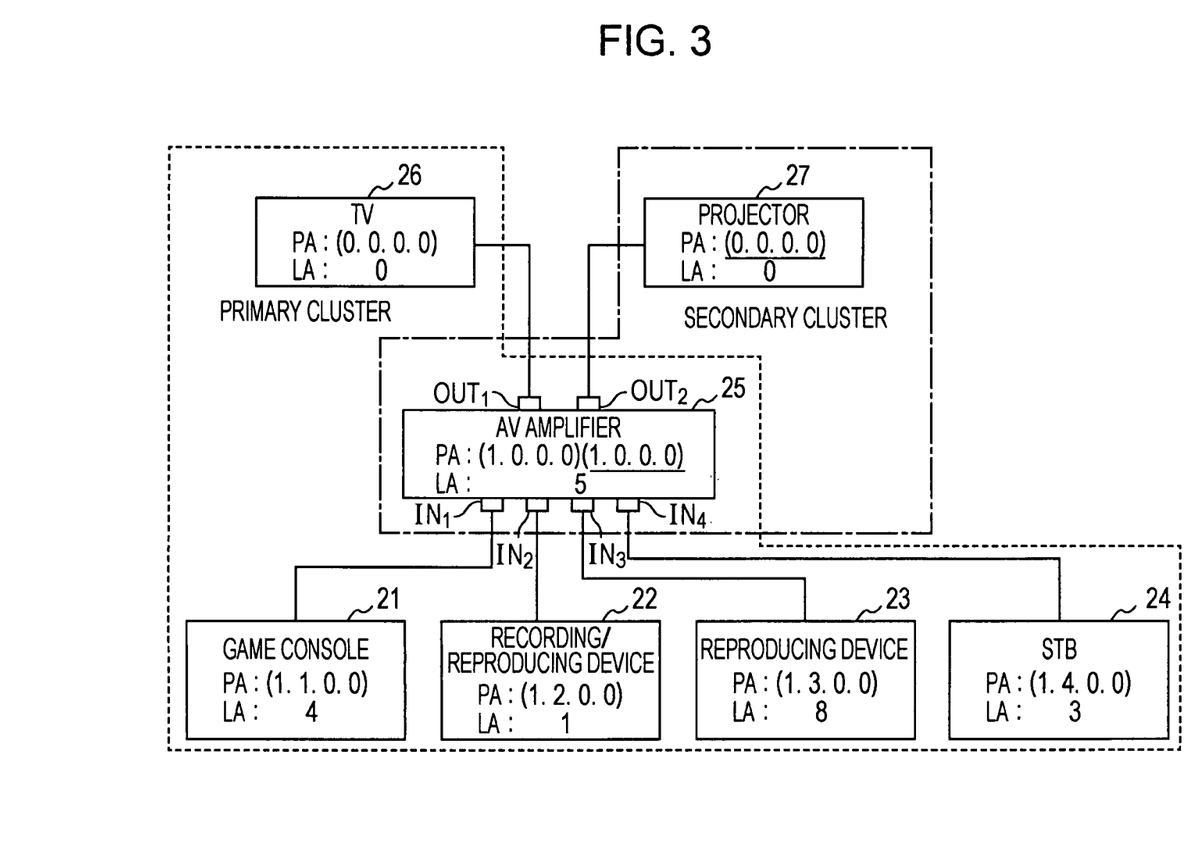
FIG. 3 illustrates a physical address and a logical address of each HDMI® device in the AV system in FIG. 2.

FIG. 3 shows a physical address and a logical address of each HDMI® device in the AV system in FIG. 2 which are set based on the HDMI® specification.

According to the HDMI® specification, addressing for CEC is performed to assign the physical address (PA) and the logical address (LA) of the game console 21, the recording/reproducing device 22, the reproducing device 23, the STB 24, the AV amplifier 25, and the TV 26 connected to the primary HDMI® output terminal OUT1. In other words, the game console 21, the recording/reproducing device 22, the reproducing device 23, the STB 24, the AV amplifier 25, and the TV 26 form a cluster (primary cluster) which is controllable with CEC.

Within the primary cluster, the physical address of the game console 21 is (1.1.0.0) and the logical address is "4", for example. The physical address of the recording/reproducing device 22 is (1.2.0.0) and the logical address is "1". The physical address of the reproducing device 23 is (1.3.0.0) and the logical address is "8". The physical address of the STB 24 is (1.4.0.0) and the logical address is "3". The physical address of the AV amplifier 25 is (1.0.0.0) and the logical address is "5". The physical address of the TV 26 is (0.0.0.0) and the logical address is "0".

Also, addressing for CEC is performed to assign the physical address (PA) and the logical address (LA) of the AV amplifier 25 and the projector 27 connected to the secondary HDMI® output terminal OUT2. In other words, the AV amplifier and the projector 27 form a cluster (secondary cluster) which is controllable with CEC.

Within the secondary cluster, the physical address of the AV amplifier 25 is (1.0.0.0) and the logical address is "5", for example. The physical address of the projector 27 is (0.0.0.0) and the logical address is "0".

The clusters described above are formed according to the HDMI® specification, and the projector 27 connected to the secondary HDMI® output terminal OUT2 does not recognize the game console 21, the recording/reproducing device 22, the reproducing device 23, and the STB 24. Therefore, for example, an operation of causing the reproducing device 23 to reproduce contents in a menu displayed in the projector 27 is not available.

Thus, the AV amplifier 25 as a communication device according to the embodiment of the present invention causes the logical address of the HDMI® source belonging to the primary cluster to be held virtually within the secondary cluster, so that the projector 27 can recognize the game console 21, the recording/reproducing device 22, the reproducing device 23, and the STB 24.

[Configuration Example of the AV Amplifier 25]

Figure 4:
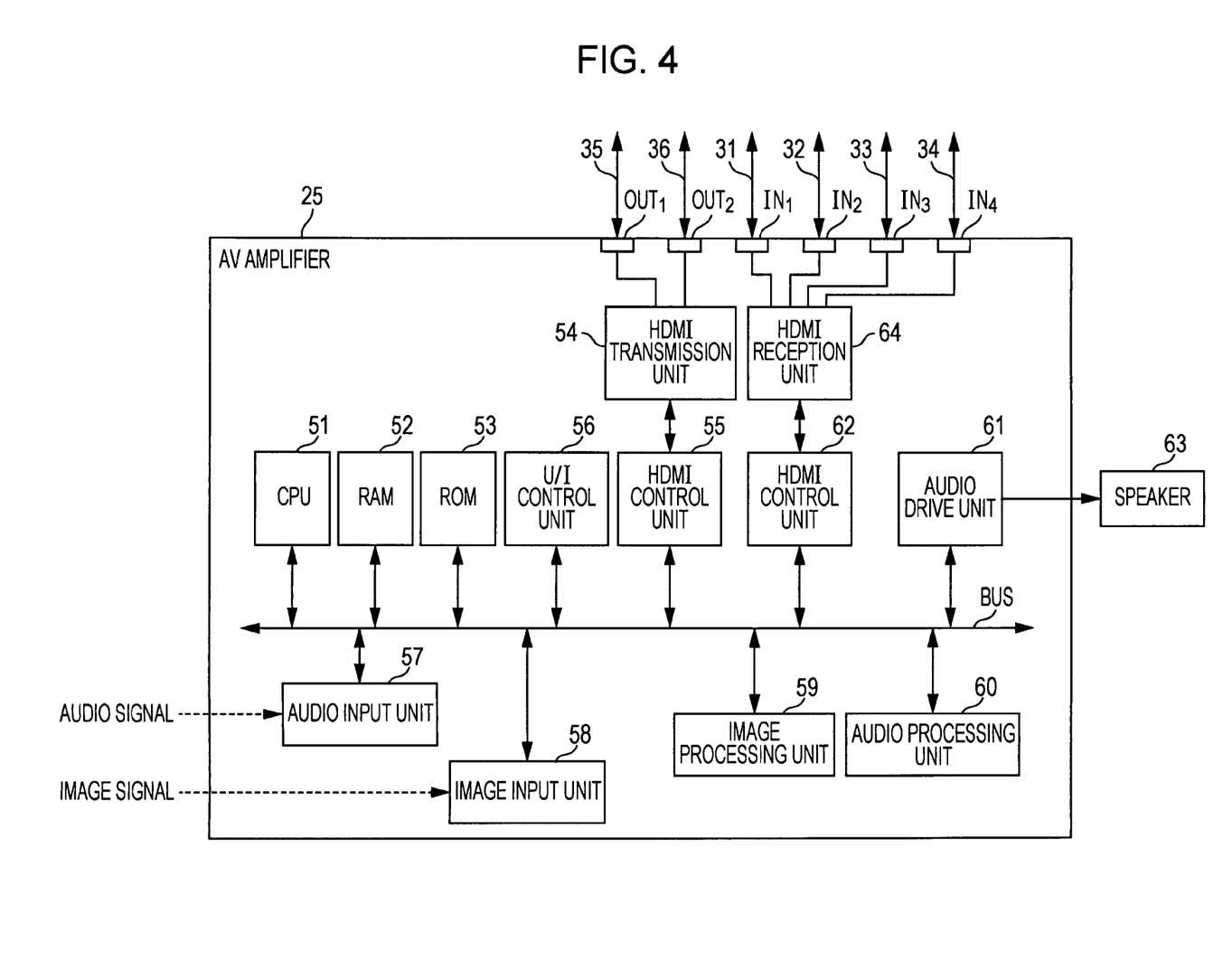
FIG. 4 is a block diagram showing a configuration example of an AV amplifier.

FIG. 4 is a block diagram showing a configuration example of the AV amplifier 25.

The AV amplifier 25 includes a CPU 51, a RAM 52, a ROM 53, an HDMI® transmission unit 54, an HDMI® control unit 55, a U/I control unit 56, an audio input unit 57, an image input unit 58, an image processing unit 59, an audio processing unit 60, an audio drive unit 61, an HDMI® control unit 62, and an HDMI® reception unit 64. The CPU 51, the RAM 52, the ROM 53, the HDMI® control unit 55, the U/I control unit 56, the audio input unit 57, the image input unit 58, the image processing unit 59, the audio processing unit 60, the audio drive unit 61, and the HDMI® control unit 62 are interconnected by a bus.

Note that, in FIG. 4, an external speaker 63 not shown in FIG. 2 is connected to the AV amplifier 25.

The central processing unit (CPU) 51 performs an overall control of the entire AV amplifier 25 by executing a program stored in the read only memory (ROM) 53.

Into the random access memory (RAM) 52, the program to be executed by the CPU 51 is loaded. The RAM 52 also functions as a work area for the CPU 51. That is, the RAM 52 stores data for operation of the CPU 51.

The ROM 53 stores a program which is to be executed by the CPU 51 for a process (control) described later.

According to a control by the HDMI® control unit 55, the HDMI® transmission unit 54 transmits an AV signal to the TV 26 and the projector 27 via the cables 35 and 36 (see FIG. 2) and causes a control signal to be exchanged (relayed) between the TV 26 and the projector 27.

According to the control by the CPU 51, the HDMI® control unit 55 controls transmission of the AV signal, exchange of the control signal, and the like by the HDMI® transmission unit 54.

The user interface (U/I) control unit 56 receives an operation signal corresponding to an operation by the user from a remote control (not shown) which remotely controls the AV amplifier 25. Also, the U/I control unit 56 receives an operation signal input by the user through operation of an operation button or the like provided to an operation panel (not shown) of the AV amplifier 25. Then, the U/I control unit 56 supplies the received operation signal to the CPU 51.

The audio input unit 57 includes an interface (for example, RCA interface or optical digital interface) for inputting an audio signal in a format different from the HDMI® format and outputs the input audio signal to the bus.

The image input unit 58 includes an interface (for example, RCA interface or analog component interface) for inputting an image signal in a format different from the HDMI® format and outputs the input image signal to the bus.

The image processing unit 59 performs predetermined image processing on the image signal output to the bus from the image input unit 58 or the image signal of an AV signal output to the bus by the HDMI® control unit 62, and outputs the image signal to the bus.

The audio processing unit 60 performs encoding, decoding, a sampling process, or other processing on the audio signal output to the bus from the audio input unit 57 or the audio signal of the AV signal output to the bus by the HDMI® control unit 62, and outputs the audio signal to the bus.

The audio drive unit 61 drives the speaker 63 in response to the audio signal on the bus.

According to the control by the CPU 51, the HDMI® control unit 62 controls reception of an AV signal, exchange of a control signal, and the like by the HDMI® reception unit 64.

The speaker 63 is driven by the audio drive unit 61 to output audio. Note that although the speaker 63 is provided outside the AV amplifier 25 in FIG. 4, the speaker 63 may be built in the AV amplifier 25.

According to a control by the HDMI® control unit 62, the HDMI® reception unit 64 receives the AV signal transmitted from the game console 21, the recording/reproducing device 22, the reproducing device 23, or the STB 24 via the cables 31 to (see FIG. 2) and causes the control signal to be exchanged (relayed) among the game console 21, the recording/reproducing device 22, the reproducing device 23, and the STB 24.

With the AV amplifier 25 configured in a manner described above, the HDMI® source connected to the HDMI® input terminals IN1 to IN4 is recognized within the primary cluster through communication according to the HDMI® specification. For example, the reproducing device 23 connected to the HDMI® input terminal IN3 is recognized within the primary cluster.

Then, the CPU 51 performs a control of notifying the HDMI® sink within the secondary cluster of a function of the HDMI® source recognized within the primary cluster as a function (device) belonging to the CPU 51. For example, the CPU 51 performs a control of notifying the projector 27 within the secondary cluster as if a reproducing function of the reproducing device 23 belongs to the CPU 51. As a result, the HDMI® sink within the secondary cluster can recognize the HDMI® source as a device (function) belonging to the HDMI® repeater.

Accordingly, for example, the projector 27 within the secondary cluster can output an operation command for the reproducing function of the device (function) apparently belonging to the AV amplifier 25. When a command with respect to the reproducing function within the secondary cluster is supplied, the CPU 51 of the AV amplifier 25 performs a conversion and outputs a command with respect to the reproducing device 23 within the primary cluster which corresponds to the reproducing function. It appears to the user as if the projector 27 is recognizing the reproducing device 23, and the operation of the reproducing device 23 can be controlled from the projector 27.

[Address Acquisition Process within the Primary Cluster when the Reproducing Device 23 is Connected]

Figure 5:
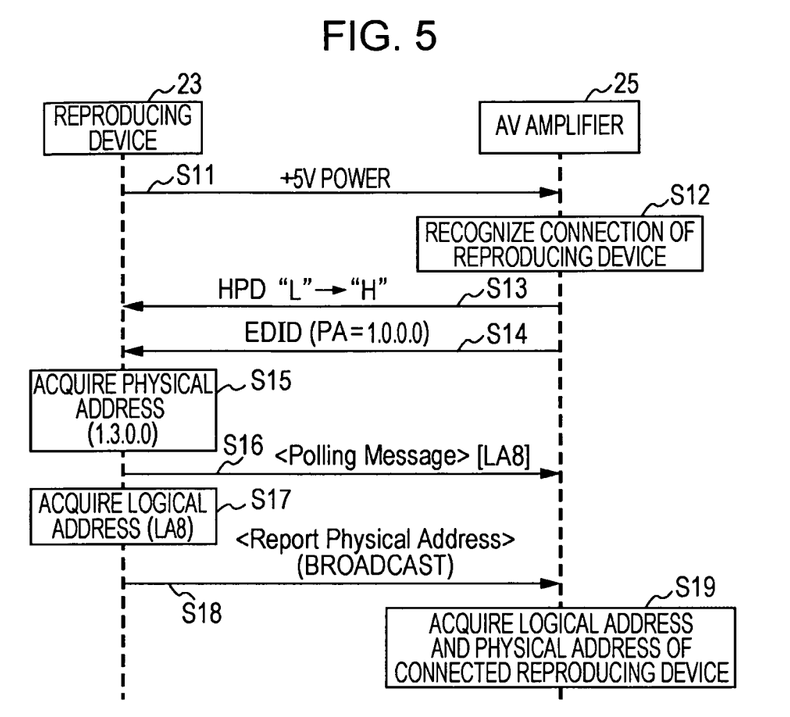
FIG. 5 is a flowchart illustrating an address acquisition process within a primary cluster.

A process of acquiring an address within the primary cluster when the reproducing device 23 is connected to the HDMI® input terminal IN3 of the AV amplifier 25 with the cable 33 is described with reference to a flowchart in FIG. 5. Note that the game console 21, the recording/reproducing device 22, and the TV 26 are connected to the AV amplifier 25 respectively with the cables 31, 32, and 35 before the process in FIG. 5 is started.

An HDMI® cable includes multiple signal lines. Signal lines relating to acquisition of an address are +5V power line, hot plug detect (HPD) line, and DDC line. When the reproducing device 23 is connected to HDMI® input terminal IN3 of the AV amplifier 25 with the cable 33, the reproducing device 23 supplies a power supply of +5 V from the +5V power line to the AV amplifier 25 via the cable 33 in step S11.

In step S12, the AV amplifier 25 recognizes the connection of the HDMI® device (herein, the reproducing device 23) to the HDMI® input terminal IN3 by detecting that the power supply of +5 V has been supplied to a +5V power terminal of the HDMI® input terminal IN3.

In step S13, the AV amplifier 25 prepares to provide EDID of the AV amplifier 25 to the reproducing device 23 and, once preparation is completed, causes a signal of an HPD line to shift from low (L) level to high (H) level.

In step S14, the reproducing device 23 detects that the signal of the HPD line has shifted to high (H) level and acquires the EDID of the AV amplifier 25 via the DDC line.

In step S15, the reproducing device 23 acquires the physical address (1.3.0.0) of the reproducing device 23 from a source physical address field of the acquired EDID and also recognizes the physical address (1.0.0.0) of the AV amplifier 25 as a destination.

In step S16, the reproducing device 23 transmits a <Polling Message> command for the logical address "8" intended for acquisition and waits a predetermined period of time for a reply (Ack) with respect to the command. If another HDMI® device has already acquired the logical address "8", there is a reply (Ack) with respect to the <Polling Message> command for the logical address "8".

After the predetermined period of time has passed from transmission of the <Polling Message> for the logical address "8" in a state without a reply, the reproducing device 23 acquires the logical address "8" in step S17. Then, in step S18, the reproducing device 23 broadcasts (transmits) a <Report Physical Address> message.

In step S19, the AV amplifier 25 acquires the physical address (1.3.0.0) and the logical address "8" of the connected reproducing device 23. Since the transmission is made through broadcasting, all of the HDMI® devices other than the AV amplifier 25 within the primary cluster also acquire the physical address (1.3.0.0) and the logical address "8" of the reproducing device 23.

In a manner described above, the physical address and the logical address are acquired when the reproducing device 23 is connected to the AV amplifier 25, and all of the HDMI® devices within the primary cluster also recognize the acquisition.

Note that transmission of a <Polling Message> command for the logical address "4" and reception of a reply thereto by the reproducing device 23 are omitted in a sequence in FIG. 5. That is, the reproducing device 23 first transmits the <Polling Message> command for the logical address "4" as a logical address intended for acquisition and receives a reply from the game console 21 belonging to the same device type of "playback device". Accordingly, it is determined that the logical address "4" is already in use, and the <Polling Message> command for the next logical address "8" is transmitted. However, in FIG. 5, the transmission of the <Polling Message> command for the logical address "4" and the reception of the reply thereto are omitted.

[Address Acquisition Process within the Secondary Cluster when the Reproducing Device 23 is Connected]

Figure 6:
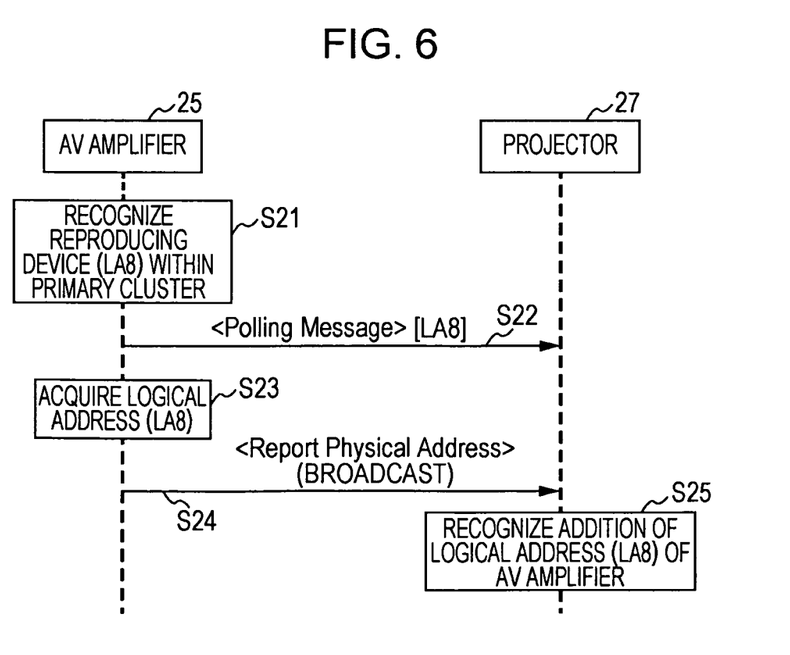
FIG. 6 is a flowchart illustrating an address acquisition process within a secondary cluster.

Next, a process of acquiring within the secondary cluster an address corresponding to an HDMI® device upstream of the AV amplifier 25 when the reproducing device 23 is connected to the HDMI® input terminal IN3 of the AV amplifier with the cable 33 is described with reference to a flowchart in FIG. 6.

First, in step S21, the AV amplifier 25 recognizes the reproducing device 23 within the primary cluster. A process in step S21 is specifically the process in FIG. 5 in which the AV amplifier 25 recognizes that the reproducing device 23 with the physical address (1.3.0.0) and the logical address "8" exists within the primary cluster.

In step S22, the AV amplifier 25 transmits the function of the reproducing device 23 within the primary cluster as the function of the AV amplifier 25 to the projector 27 within the secondary cluster. That is, in a similar manner to a process in step S16 in FIG. 5 which is performed by the reproducing device 23 within the primary cluster, the AV amplifier 25 transmits the <Polling Message> command for the logical address "8" within the secondary cluster and waits a predetermined period of time for a reply with respect to the command.

After the predetermined period of time has passed from transmission of the <Polling Message> for the logical address "8", the AV amplifier 25 acquires the logical address "8" within the secondary cluster in step S23 and broadcasts the <Report Physical Address> message in step S24.

In step S25, the projector 27 recognizes "8" additionally as the logical address of the AV amplifier 25.

Through the process described above, the AV amplifier 25 acquires the original logical address "5" of the AV amplifier 25 and the logical address "8" within the secondary cluster. Since the process similar to that in FIG. 6 is performed for each of the game console 21, the recording/reproducing device 22, and the STB 24, the AV amplifier 25 also acquires the logical addresses "4", "1", and "3" within the secondary cluster.

[Logical Address within the Secondary Cluster]

Figure 7:
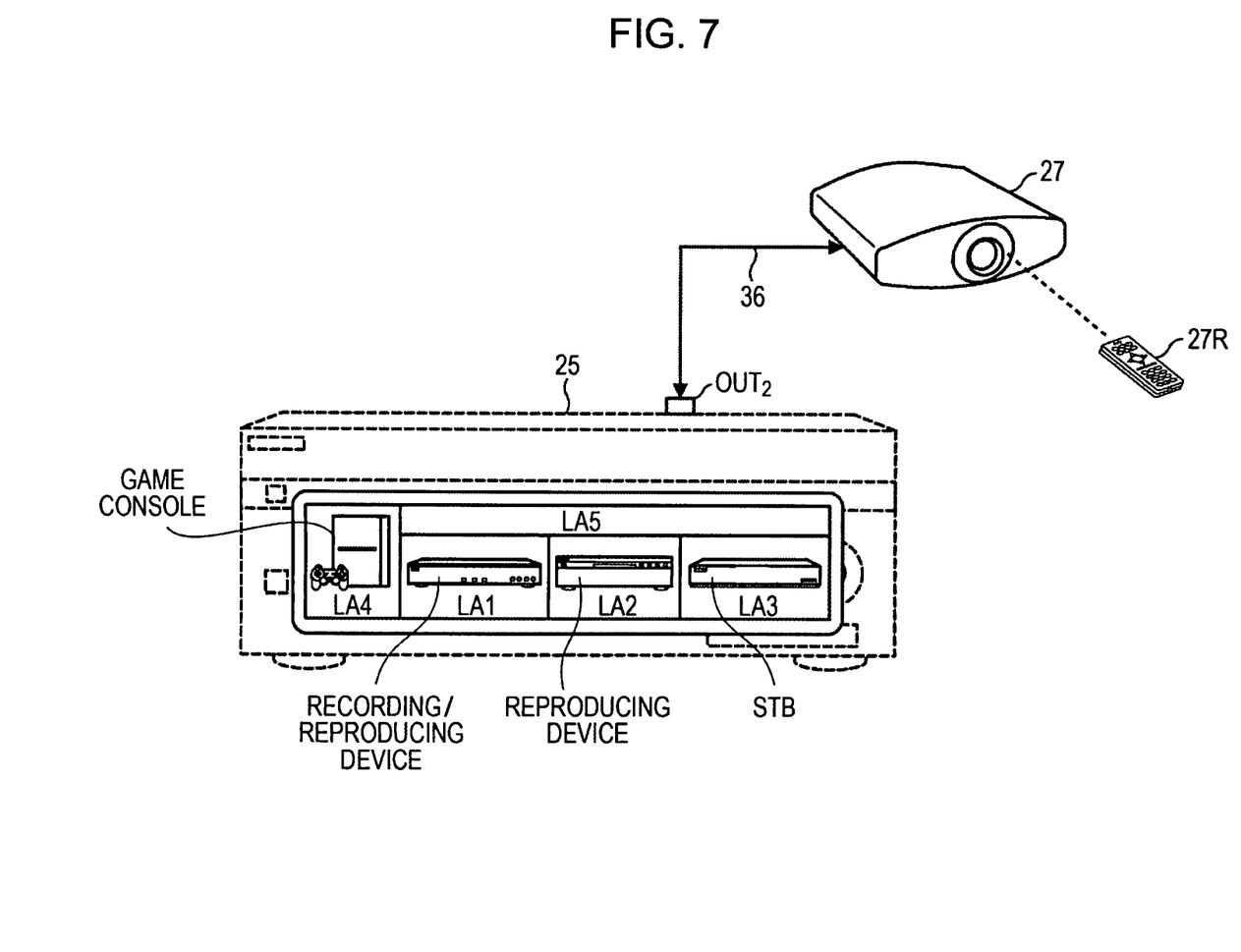
FIG. 7 illustrates a logical address set in the secondary cluster.

FIG. 7 shows the logical address set in the secondary cluster through the process described with reference to FIG. 6.

The projector 27 within the secondary cluster does not recognize the game console 21, the recording/reproducing device 22, the reproducing device 23, and the STB 24 within the primary cluster. Instead, it appears to the projector 27 as if the AV amplifier 25 has functions of the game console 21, the recording/reproducing device 22, the reproducing device 23, and the STB 24. That is, the projector 27 recognizes the AV amplifier 25 as a device having all functions corresponding to the logical addresses "5" (audio system), "4" (playback device 1), "1" (recording device), "8" (playback device 2), and "3" (tuner). A function of the HDMI® source upstream of the AV amplifier 25 within the primary cluster which actually does not belong to the AV amplifier 25 is called a virtual device, and the logical address of the virtual device is referred to as a virtual logical address in this specification.

[Process when the Projector 27 Gives a Command for Reproduction to the Reproducing Device 23]

The projector 27 can recognize the game console 21, the recording/reproducing device 22, the reproducing device 23, and the STB 24 within the primary cluster, which are not recognized with the standard HDMI® specification, as virtual devices. By performing the CEC control with respect to the virtual devices with the projector 27, the CEC control with respect to the game console 21, the recording/reproducing device 22, the reproducing device 23, and the STB 24 from the projector 27 is made possible.

A process when the reproducing device 23 is caused to reproduce contents through a user interface of the projector 27 is described with reference to a flowchart in FIG. 8.

The user makes an instruction for reproduction by the reproducing device 23 as the virtual device through the user interface of the projector 27. For example, "play with the reproducing device 23" is selected in a screen on the projector 27 through operation of an operation button of the remote control 27R of the projector 27.

When reproduction by the reproducing device 23 as the virtual device is instructed by the user, the projector 27 accepts a reproducing operation for the reproducing device 23 as the virtual device in step S31. Then, in step S32, the projector 27 transmits a command for reproduction to the AV amplifier 25. Specifically, a <Play> ["Forward"] command with respect to the virtual logical address "8" of the AV amplifier is transmitted from the projector 27 to the AV amplifier 25.

In step S33, the AV amplifier 25 converts the virtual logical address "8" of the received <Play>["Forward"] command to the physical address and the logical address of the corresponding HDMI® device within the primary cluster. That is, the AV amplifier 25 converts the virtual logical address "8" within the secondary cluster to the physical address (1.3.0.0) and the logical address "8" of the reproducing device 23.

In step S34, the AV amplifier 25 determines whether an active source within the primary cluster is the reproducing device 23. When it is determined that the active source is the reproducing device 23 in step S34, the process proceeds to step S37 described later.

On the other hand, when it is determined that the active source is not the reproducing device 23 in step S34, the process proceeds to step S35 in which the AV amplifier 25 designates the physical address (1.3.0.0) of the reproducing device 23 and broadcasts a <Set Stream Path> command.

In step S36, the reproducing device 23 designates the physical address (1.3.0.0) of the reproducing device 23 and broadcasts an <Active Source> command to show that the reproducing device 23 has become the active source.

Confirming that the reproducing device 23 has become the active source, the AV amplifier 25 transmits the <Play> ["Forward"] command to the reproducing device 23 in step S37.

In step S38, the reproducing device 23 returns a <Deck Status> ["Play"] message to the AV amplifier 25 to notify the AV amplifier 25 that reproduction has started.

In step S39, the AV amplifier 25 receives the <Deck Status> ["Play"] message and converts the physical address (1.3.0.0) and the logical address "8" of the reproducing device 23 to the virtual logical address "8" within the secondary cluster.

Then, in step S40, the AV amplifier 25 returns to the projector 27 the <Deck Status> ["Play"] message showing that the virtual device with the virtual logical address "8" of the AV amplifier 25 has started reproduction.

Figure 8:
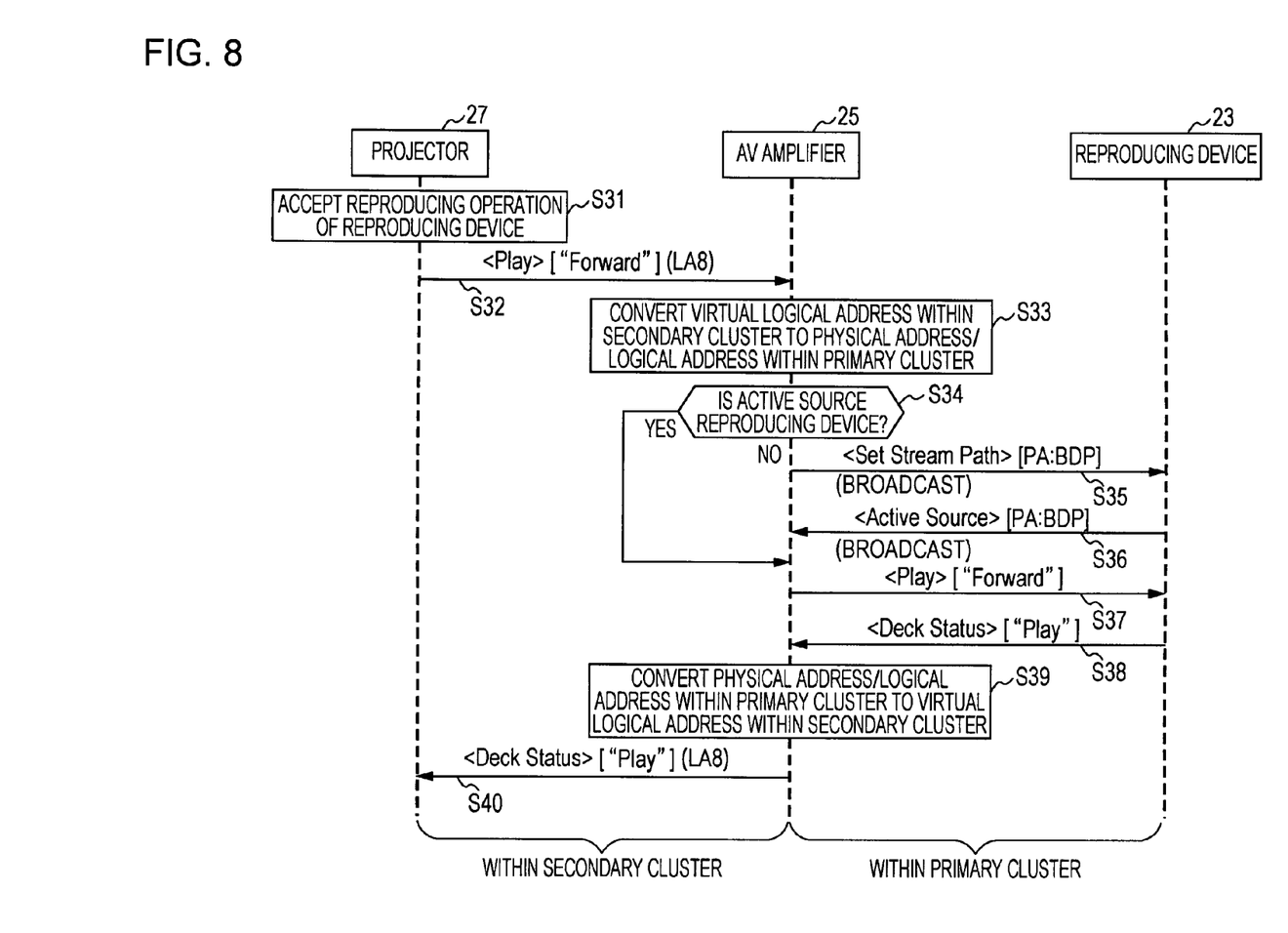
FIG. 8 is a flowchart illustrating a process when reproduction of contents is performed from a projector.

In FIG. 8, steps S32 and S40 show communication (CEC control) within the secondary cluster, and steps S35 and S38 show communication (CEC control) within the primary cluster.

In the AV amplifier 25, the CPU 51 executes an address conversion between the primary cluster and the secondary cluster, selection of a transmission command, or the like, and the HDMI® transmission unit 54 and the HDMI® control unit 55 directly transmits or receives a command or message.

In a manner described above, the AV amplifier 25 which is the HDMI® repeater performs a conversion to obtain the address within the primary cluster and transmits the command from the projector 27 within the secondary cluster to the corresponding HDMI® device. Also, the AV amplifier 25 performs a conversion to obtain the virtual logical address within the secondary cluster and transmits to the projector 27 a response command with respect to the command transmitted to the corresponding HDMI® device within the primary cluster. In this manner, the AV amplifier 25 shows the HDMI® source within the primary cluster as the virtual device to the projector 27 (HDMI® sink) within the secondary cluster to enable control with respect to the HDMI® source within the primary cluster from the projector 27.

In the example described above, the process of causing the reproducing device 23 to perform the reproducing operation from the user interface of the projector 27 has been described. However, a process other than the reproducing operation can be controlled in a similar manner, as long as an operation (command) of the process is started by the HDMI® sink within the secondary cluster. Note that a process of which an operation (command) is started by the HDMI® source, such as an operation generally called "One Touch Play" or "One Touch Record", may be within a range of application.

As described with reference to FIG. 6, exchange of a command by the AV amplifier 25 using the CEC line within the secondary cluster suffices to enable control with respect to the HDMI® source within the primary cluster from the projector 27. In other words, the HPD line and the DDC line are not used, and resetting or the like is not performed. Also, the EDID stored in the AV amplifier 25 is not changed. Since only 2 bytes are used for the logical address, resource can be saved.

Thus, when the HDMI® repeater includes two HDMI® outputs, the HDMI® sink not belonging to the primary cluster can control the HDMI® source within the primary cluster more easily than with a method of Japanese Unexamined Patent Application Publication No. 2008-153974 which involves resetting of HPD or operation of DDC. Accordingly, user-friendliness of the TV 26 and the projector 27 connected to the multiple HDMI® output terminals OUT1 and OUT2 can be improved.

The embodiment in which the HDMI® repeater includes the two HDMI® output terminals OUT1 and OUT2 has been described above. However, when the HDMI® repeater includes three or more HDMI® output terminals, three or more HDMI® sinks connected thereto can also be made to perform the CEC control in a similar manner.

Note that, in this specification, the steps described in the flowchart may be executed in parallel or at an appropriate timing, such as upon a call, to be processed chronologically in the stated order or otherwise.

Embodiments of the present invention are not limited to the embodiment described above, and various modifications are possible within the scope of the present invention.

What is claimed is:

1. A communication device comprising:
multiple output terminals to output, through an interface including at least a signaling channel through which a baseband signal is transmitted in one direction and a bidirectional control channel used for control, the baseband signal;
one or more input terminals to be input with the baseband signal through the interface;
the multiple output terminals including a primary output terminal through which the control is preferentially performed with another device connected to the one or more input terminals and a secondary output terminal;
the communication device further comprising:
the control channel being a consumer electronics control (CEC) line,
a control means for performing a control of notifying another device connected to the secondary output terminal of a function of another device connected to the one or more input terminals as a function of the communication device via only the CEC line so as to enable the another device connected to the secondary output terminal to recognize the another device connected to the one or more input terminals without use of a hot plug detect (HPD) line or a display data channel (DDC) line and without changing extended display identification data (EDID) stored in the communication device,
in which the multiple output terminals include the primary output terminal and a plurality of secondary output terminals, and
in which a sink device is connectable to each of the secondary output terminals, and in which the control means is operable to perform a control of notifying each said sink device respectively connected to each of the secondary output terminals of a function or functions of another device or devices connected to the one or more input terminals as a function of the communication device via only the CEC line so as to enable each of the sink devices connected to the secondary output terminals to recognize the another device or devices connected to the one or more input terminals without use of the hot plug detect (HPD) line or the display data channel (DDC) line and without changing the extended display identification data (EDID) stored in the communication device.

2. The communication device according to claim 1, wherein the communication device is a repeater, another device connected to the one or more input terminals is a source, and another device connected to the primary output terminal and the secondary output terminal is a sink, and wherein the interface, the repeater, the source and the sink conform to a predetermined high-speed standard.

3. The communication device according to claim 2, wherein the control means performs a control of notifying the sink connected to the secondary output terminal of a logical address of the one or more sources as a logical address of the communication device.

4. The communication device according to claim 3, wherein, when a command designating the logical address of the one or more sources is received from the sink connected to the secondary output terminal, the control means performs a control of transmitting the command to the source corresponding to the designated logical address.

5. The communication device according to claim 1, in which each said another device connected to the one or more input terminals is a source device and in which a number of input terminals is four such that four separate source devices are respectively connectable to the four input terminals.

6. A communication control method in which a communication device including multiple output terminals to output, through an interface including at least a signaling channel through which a baseband signal is transmitted in one direction and a bidirectional control channel used for control, the baseband signal and one or more input terminals to be input with the baseband signal through the interface, the multiple output terminals including a primary output terminal through which the control is preferentially performed with another device connected to the one or more input terminals and a secondary output terminal, the communication control method further comprising: the control channel being a consumer electronics control (CEC) line, performs a control of notifying another device connected to the secondary output terminal of a function of another device connected to the one or more input terminals as a function of the communication device via only the CEC line so as to enable the another device connected to the secondary output terminal to recognize the another device connected to the one or more input terminals without use of a hot plug detect (HPD) line or a display data channel (DDC) line and without changing extended display identification data (EDID) stored in the communication device,
in which the multiple output terminals include the primary output terminal and a plurality of secondary output terminals, and
in which a sink device is connectable to each of the secondary output terminals, and in which control is performed to notify each said sink device respectively connected to each of the secondary output terminals of a function or functions of another device or devices connected to the one or more input terminals as a function of the communication device via only the CEC line so as to enable each of the sink devices connected to the secondary output terminals to recognize the another device or devices connected to the one or more input terminals without use of the hot plug detect (HPD) line or the display data channel (DDC) line and without changing the extended display identification data (EDID) stored in the communication device.

7. A non-transitory computer readable memory having stored thereon a program for causing a computer of a communication device including multiple output terminals to output, through an interface including at least a signaling channel through which a baseband signal is transmitted in one direction and a bidirectional control channel used for control, the baseband signal and one or more input terminals to be input with the baseband signal through the interface, the multiple output terminals including a primary output terminal through which the control is preferentially performed with another device connected to the one or more input terminals and a secondary output terminal, the communication device further comprising: the control channel being a consumer electronics control (CEC) line, to execute a process of notifying another device connected to the secondary output terminal of a function of another device connected to the one or more input terminals as a function of the communication device via only the CEC line so as to enable the another device connected to the secondary output terminal to recognize the another device connected to the one or more input terminals without use of a hot plug detect (HPD) line or a display data channel (DDC) line and without changing extended display identification data (EDID) stored in the communication device,    in which the multiple output terminals include the primary output terminal and a plurality of secondary output terminals, and    in which a sink device is connectable to each of the secondary output terminals, and in which the process of notifying includes notifying each said sink device respectively connected to each of the secondary output terminals of a function or functions of another device or devices connected to the one or more input terminals as a function of the communication device via only the CEC line so as to enable each of the sink devices connected to the secondary output terminals to recognize the another device or devices connected to the one or more input terminals without use of the hot plug detect (HPD) line or the display data channel (DDC) line and without changing the extended display identification data (EDID) stored in the communication device.

8. A communication device comprising:
multiple output terminals to output, through an interface including at least a signaling channel through which a baseband signal is transmitted in one direction and a bidirectional control channel used for control, the baseband signal;
one or more input terminals to be input with the baseband signal through the interface;
the multiple output terminals including a primary output terminal through which the control is preferentially performed with another device connected to the one or more input terminals and a secondary output terminal;
the communication device further comprising:
   the control channel being a consumer electronics control (CEC) line,
   a control unit to perform a control of notifying another device connected to the secondary output terminal of a function of another device connected to the one or more input terminals as a function of the communication device via only the CEC line so as to enable the another device connected to the secondary output terminal to recognize the another device connected to the one or more input terminals without use of a hot plug detect (HPD) line or a display data channel (DDC) line and without changing extended display identification data (EDID) stored in the communication device,
   in which the multiple output terminals include the primary output terminal and a plurality of secondary output terminals, and
   in which a sink device is connectable to each of the secondary output terminals, and in which the control unit is operable to perform a control of notifying each said sink device respectively connected to each of the secondary output terminals of a function or functions of another device or devices connected to the one or more input terminals as a function of the communication device via only the CEC line so as to enable each of the sink devices connected to the secondary output terminals to recognize the another device or devices connected to the one or more input terminals without use of the hot plug detect (HPD) line or the display data channel (DDC) line and without changing the extended display identification data (EDID) stored in the communication device.

* * * * *